Patented June 6, 1933

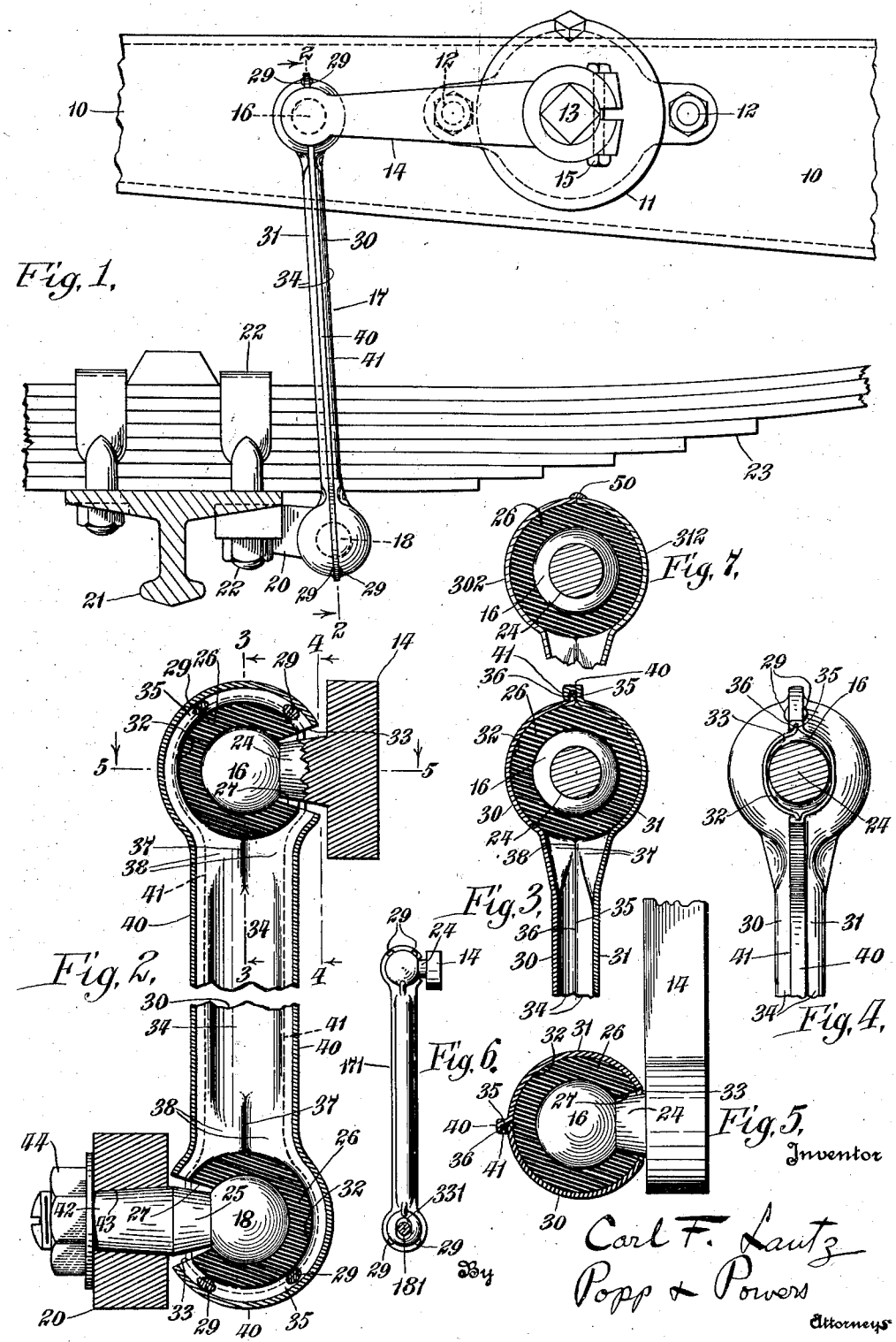
June 6, 1933. C. F. LAUTZ 1,912,780
OSCILLATORY JOINT
Filed Sept. 15, 1930

1,912,780

UNITED STATES PATENT OFFICE

CARL F. LAUTZ, OF BUFFALO, NEW YORK, ASSIGNOR TO HOUDE ENGINEERING CORPORATION, OF BUFFALO, NEW YORK, A CORPORATION OF NEW YORK

OSCILLATORY JOINT

Application filed September 15, 1930. Serial No. 481,881.

This invention relates to a pivot joint comprising movable parts which oscillate or move with respect to each other through a relatively small angle. In particular the invention relates to a sheet-metal, rubber-bearing or resilient sleeved drag link for pivotally connecting the arm of an automobile shock absorber to the adjacent part of the axle of the automobile.

One of the objects of the invention is to provide a form of oscillatory joint in which the pivot head is made integral with a lever or other relatively large co-operating element, which construction precludes the passing of the shank of said pivot head through a hole of smaller diameter than the diameter of the pivot head during the assembly operation of the different parts, and hence necessitates a special split construction or its equivalent.

Another object of the invention is to provide an oscillatory joint of the ball and socket type in which the actual movement of the parts is effected in the simplest manner capable of eliminating noise and the necessity of lubrication by means of a resilient sleeve.

A further object of the invention is to provide for the maximum anchorage area of said resilient sleeve and yet permit of an adequately free movement of the parts relatively to each other.

A still further object of the invention is to provide a type of oscillatory joint which may be manufactured on a production basis with a minimum requirement of machine work upon the component parts.

Numerous other objects of the invention and practical solutions therefore are described and shown in detail in the herein patent specification wherein:

In the accompanying figures:

Figure 1 is a side elevation on a reduced scale of a split drag link having a ball and socket oscillatory joint at each end and illustrated in a typical installation of the same on an automobile in combination with a shock absorber and an automobile axle.

Figure 2 is a vertical, longitudinal section through said split drag link with its associated parts, the section being taken in the plane of the split of said drag link.

Figures 3 and 4 are fragmentary, vertical, longitudinal sections through the split drag link and upper pivot head, said sections being taken in planes perpendicular to the split of said drag link and on correspondingly numbered lines of Fig. 2.

Figure 5 is a horizontal, transverse section through the upper part of the drag link showing the upper pivot head and a portion of the shock absorber actuating lever and taken on line 5—5, Fig. 2.

Figure 6 is a diminutive side elevation of a modified form of drag link.

Figure 7 is a fragmentary horizontal, transverse section similar to Fig. 5 but through the upper part of a modified form of split drag link.

My invention may be embodied in various forms and in oscillatory joints of different constructions and the present applications are therefore to be regarded merely as some of the possible organizations which come within the scope of my invention and satisfactorily carry out the function of the same in practice. As here shown (referring for the present to Figs. 1–5 inclusive) the same is constructed as follows:

To the channel beam or main side bar 10 of an automobile body is secured a dual wing type or other suitable form of hydraulic shock absorber 11 by means of bolts 12 which connect the ears of said shock absorber with the web of said channel beam 10. Rotatably mounted in said shock absorber is a rock shaft 13 to which is secured an actuating lever 14, the larger or inner end of which is preferably split for purposes of adjustment and is clamped to said shock absorber rock shaft 13 by means of a clamp bolt 15, while its smaller or outer end is integrally provided with an upper pivot head 16 spaced somewhat apart from said actuating lever. This upper pivot head 16 constitutes the male element of a ball and socket joint which serves to connect the outer end of said actuating lever 14 with the upper end of a drag link 17.

A similar lower pivot head 18 is received within the lower end of said drag link 17 to form a ball and socket joint which connects said drag link with a bracket 20, the latter being secured to the automobile axle 21 by the usual U-shaped spring clip bolt 22 which incidentally also serves in the usual and well known manner to secure said axle to the central or thick portion of the multiple leaf automobile spring assembly 23.

It is the construction of the drag link 17 together with the ball and socket joints at its opposite ends which constitutes the essence of the herein invention, and these parts will now be explained in detail.

The upper and lower pivot heads 16 and 18 are provided with preferably slightly tapered shanks 24 and 25 respectively. Both of these shanks are of smaller diameter than the spherical portions of their companion pivot heads 16 and 18. Over each of said pivot heads is slipped a hollow, spherical resilient sleeve 26 which is preferably constructed of a composition containing rubber as a major ingredient. On one side of each resilient sleeve is formed a circular opening 27 preferably of larger size than the periphery of its companion shank 16 or 18, the diameter of this opening being smaller than the diameter of the spherical portion of its companion pivot head and likewise smaller than the internal diameter of the spherical resilient sleeve 26 itself. In its unstretched or normal state, the internal diameters of said spherical resilient sleeve 26 and its opening 27 are approximately the same as the corresponding diameters of the semi-spherical portions of the heads 16 and 18 and their shanks 24 and 25. Hence when said resilient sleeves 26 are slipped over the pivot heads 16 and 18, the circular opening 27 of each sleeve is first stretched somewhat to enable said opening to be passed over the spherical portion of its companion pivot head and then slips into the position shown in the drawing, i. e., with the companion pivot head shank 24 or 25 received within the opening 27 of its companion semi-spherical resilient sleeve 26 and the spherical portions of its companion pivot head 16 or 18 received within the semi-spherical interior of said resilient sleeve. It is preferred that when the parts are in operation, all frictional movement occurs between the peripheral surface of either spherical pivot head 16 or 18 and the inner annular surface of its companion semi-spherical resilient sleeve 26.

The drag link 17 is constructed of stamped sheet metal to form a hollow and approximately tubular shell and consists of primary and secondary drag link or shell sections 30 and 31, the split between the same being lengthwise and lying in a plane which approximately includes the axes of the two pivot heads 16 and 18 in the construction shown in Figs. 1–5. The upper and lower ends of said drag link or shell sections are shaped to form semi-spherical sockets 32 which receive the resilient sleeves 26.

A part of the lateral face of each of said sockets 32 is cut away to form an elliptical or ellipsoidal clearance aperture 33 which encircles (but at no time touches) its companion shank 24 or 25 as the various parts are moved relatively to each other. The reason for the particular shape of said aperture 33 is as follows:

It is desirable to have each semi-spherical socket 32 enclose as much of the periphery of its companion resilient sleeve 26, as possible. On the other hand, interference between the drag link or shell 17 and the pivot heads 16 and 18 must be avoided. Now in actual practice when the present invention is incorporated into a shock absorber assembly, the twisting movement of the automobile axle 21 in a horizontal direction is very small due to the fact that one end of each leaf spring assembly 23 is pivoted directly to the vehicle frame bar 10 in the usual and well known manner. Hence the swinging in a horizontal plane of the pivot heads relatively to the drag link 17 is slight and therefore the lateral clearance between either of the pivot head shanks 16 or 18 and the drag link 17 need be but slight (see Figs. 4 and 5). However, when one end of the vehicle axle 21 is moved vertically without a corresponding vertical movement of the other end of said axle, in such case the pivot heads are constrained to move considerably in an approximately vertical plane relatively to the drag link 17. This requires a relatively large longitudinal upper and lower clearance space (see Figs. 2 and 4). Thus the resulting shape of the clearance aperture 33 is necessarily that of an ellipse or ellipsoid if sufficient clearance at all times between the metal parts is to be provided and at the same time the maximum amount of peripheral surface of each spherical resilient sleeve 26 is to be supported as completely as possible within its companion socket 32.

It should be noted that the plane of the split of the drag link sections 30 and 31 passes vertically and medially through the center of the elliptical clearance apertures 33. This means that these apertures form a part of, and are a continuation of, the peripheral edge of said sections, so that when said drag link sections are initially blanked or cut out of a sheet of metal by the cutting dies of a punch press, the elliptical edges of said clearance apertures 33 are cut simultaneously with, and by the same main punch-die set as, the punch-die set which cuts out the blank of each drag link section. In other words, no separate or secondary punch or die is required for forming the elliptical apertures 33, but only a proper shaping of the main cutting die. Inasmuch then as a main cutting die is required in any case it follows that these elliptical apertures 33 are formed practically without expense.

The central part of each of the drag link or shell sections 30 and 31 is annularly dished or bellied out longitudinally at 34 to enable the drag link 17, taken as a whole, to withstand the heavy compressive stresses to which it is subjected. Furthermore, the central longitudinal part of each section is preferably somewhat narrower than the semispherical sockets 32 so as to reduce the weight of metal as much as possible without sacrificing strength. The split between said sections 30 and 31 is longitudinal and, in the particular arrangement of the parts illustrated in Figs. 1-5, said split is in the same plane in which lie the axes of the pivot heads 16 and 18. This relationship, however, changes slightly (but remains approximately true) as the vehicle axle 21 moves to various positions relatively to the frame bar 10 of the vehicle.

Spacing faces 35 and 36 are provided upon the drag link or shell sections 30 and 31 respectively, said spacing faces lying in the plane of and constituting the "split" of the drag link 17 and are formed to extend entirely around the periphery of each shell section with the exception only of the parts thereof occupied by the elliptical clearance aperture 33. Said spacing faces 35 and 36, of the shell sections 30 and 31 respectively, are arranged to transversely abut each other face to face and thereby serve to properly space said sections apart transversely relatively to each other. It will be noted that the sheet metal of which the shell sections are made is additionally tightly folded together longitudinally and medially at opposite ends of said sections to constitute longitudinal folds 37 so that the flat face or area of the spacing faces 35 and 36 is carried around the socket 32 to form flat spacing shelves 38, so that the shell sections also transversely abut face to face at this peripheral part of the sockets 32 and prevent the resilient sleeve 26 from squeezing out at this point.

Formed at the periphery of the spacing face 36 of the secondary shell section 31 is a transversely projecting locating flange 40 which embraces the peripheral transverse edge of the primary shell section 30. Said transverse locating flange extends transversely out from the entire periphery of said secondary shell section 31 and thus also from the entire periphery of its spacing face 36, thereby preventing lateral as well as endwise shifting of the two shell sections 30 and 31 when their spacing faces 35 and 36 are in contact. To maintain this position and to firmly lock the two shell sections together the two companion shell sections are first placed in a suitable die and pressed firmly together. The outer edge of said transverse locating flange 40 is then curled over the rim of the primary shell section 30 to form a retaining flange 41, thereby not only locking said shell sections together but also tightly holding the resilient sleeves 26 within their companion sockets 32.

In addition to this method of securing the two shell sections together by crimping or curling the outer portion of the locating flange 40 of the secondary shell section 31 over the outer edge of the secondary shell section 30, it has been found desirable in actual practice to additionally secure said two shell sections 30 and 31 together by a number of spot welds 29 which welds unite said shell sections at the particular points where they are subjected to the greatest strain, i. e., at the outer part of the sockets 32.

With the form of the invention shown in Figs. 1-5 previously described it is evident that, inasmuch as the joint or split between the shell sections 30 and 31 lie in a plane which at all times approximately includes the axes of the pivot heads 16 and 18, it follows that said shell sections, before they are joined together, may be placed over a pivot head (for instance over the upper pivot head 16) and also over the resilient sleeve 26 thereof, irrespective of whether or not said pivot head 16, with its shank 24 is integrally connected with the shock absorber actuating lever 14 or with any other similar large operating member. After this assembly operation the two drag link or shell sections may then be permanently secured together to form the drag link 17 by curling over the retaining flange 41 and also, if desired, by the spot welds 29 in the manner previously described. Such a form of split construction, by permitting an integral construction of pivot head 16 with an actuating lever 14 or the like, does not, however, preclude the use of such a pivot head construction as the pivot head 18 illustrated at the lower end of the drag link in Fig. 2. It will be noted that this pivot head 18 and its shank 25 are not integral with the bracket 20 or with any other large operating member as the pivot head 16 is integral with the actuating lever 14. The whole pivot head is, in this case, secured to its bracket 20 by means of a tapered neck 42 which is suitably seated in a tapered recess 43 formed in said bracket 20 and rigidly secured therein by a draw up nut 44 whose internal screw thread meshes with a suitable external screw thread formed at the rear or inner end of said pivot head 18. It should, however, be definitely understood that the construction of the drag link 17 is such that said lower pivot head 18 may, if desired, be made integral with the bracket 20 (or other relatively large operating member) in precisely the manner in which the upper pivot head 16 is made integral with the actuating lever 14.

In the previously described construction of Figs. 1–5, the arrangement of the axes of the two pivot heads 16 and 18 were such as to lie at all times in approximately the same plane. But in certain installations it is desirable to have these pivot heads at right angles to each other as for instance in Fig. 6. In such case the upper portions of the two modified shell sections which comprise this modified form of drag link 171 are constructed identically in the manner as is the upper end of the drag link 17. The lower end, however, of said modified drag link 171 is differently constructed in that the elliptical clearance aperture 331 lies in a plane parallel to the joint or split between the shell sections and therefore is formed in only one of said shell sections.

Which particular one of the shell sections is to be provided with this modified elliptical clearance aperture 171 merely depends upon the particular direction in which its companion pivot head 181 is to project. It is obvious that in such a construction, the form of pivot head used at the lower end of such a modified drag link 171 must be similar to the pivot head 18 of Fig. 2, this modified link being impossible of assembly if a pivot head of the type of upper pivot head 16 is attempted to be used at this point. At the upper end, however, of said modified drag link 171 either type of pivot head 16 or 18 may be employed as may be desired, because, at this upper end of the drag link, the joint between the shell sections approximately includes the axis of this particular pivot head in the same manner as in the drag link of Figs. 1–5.

In Fig. 6 is illustrated a form of the invention in which welding is wholly relied upon to unite together the modified companion shell sections 302 and 312, the ends of which are of symmetrical shape, size and form. In this construction a pair of these shell sections 302 and 312 are placed in a suitable die (together with their companion resilient sleeves 20 and the required pivot heads 16 and 18 or 161 and 181 or other pivot heads as the case may be) so as to hold said shell sections in proper relation to each other both longitudinally, laterally and transversely. The two shell sections are then welded or spot welded together with a direct-electric-current rod welder or other suitable welding outfit to produce a weld or a series of spot welds 50 entirely around the abutting edges of said companion shell sections 302 and 312. In this process it is preferred that the weld be made very rapidly so as not to injure the texture of the resilient sleeves 26 or the temper of the pivot heads 16, 18 or 181 as the case may be. In addition to this, said resilient sleeves and pivot heads may be suitably cooled during the welding process so as to positively ensure that no deleterious consequences result from the heat of this welding operation. As soon as the welding operation has been completed, most of the weld 50 will have cooled sufficiently to properly hold the shell sections together, so that the entire drag link with its pivot heads may be immediately removed from the die and another set of shell sections, pivot heads, etc., placed in position in the die for a similar welding operation.

It is obvious to those skilled in the art that although the present invention has been illustrated as used in a ball and socket drag link in combination with a shock absorber assembly, nevertheless the characteristics of the invention are such as to enable the same to be advantageously used with other than ball and socket joints and in other manners involving a shell or split metal construction forming part of an oscillatory joint. The following claims have, therefore, been drawn accordingly:

I claim:

1. An oscillatory joint connecting two relatively movable members, comprising a link swivelly connected to one of said members and having a spherical socket provided with an opening thereinto, a resilient bushing in said socket, a stud connected to the other of said members and extending through said opening with a head positioned within said socket and in direct contact with said resilient bushing, said resilient bushing being in substantially undeformed and non-slipping engagement with the inner wall of said socket and substantially enclosing said head and in frictional contact therewith but out of contact with the shank of said stud, whereby to provide, on account of the friction between said head and said bushing, a substantial degree of movement between said head and said bushing due to a flowing of said bushing before any slippage therebetween occurs.

2. An oscillatory joint connecting two relatively movable members, comprising a link pivotally connected at one end to one of said members and having a socket at the other end provided with an opening thereinto, a resilient bushing in said socket, a stud connected to the other of said members and extending through said opening with a spherical head positioned within said socket and in direct contact with said resilient bushing, said resilient bushing being flexibly positioned within said socket in substantially undeformed and non-slipping engagement with the inner wall of said socket and substantially enclosing said spherical head and in frictional contact therewith, said bushing having an opening through which the shank of said stud freely extends out of contact normally with said bushing, whereby to provide, on account of the friction between said head and said bushing, a substantial degree of movement between said head and said bushing due to a flowing of said bushing before any slippage therebetween occurs.

3. An oscillatory joint connecting two relatively movable members, comprising a shell swivelly connected to one of said members and having a spherical socket provided with an opening thereinto, a resilient bushing in said socket, a stud connected to the other of said members and extending through said opening with a head positioned within said socket and in direct contact with said resilient bushing, said resilient bushing being in non-slipping engagement with the inner wall of said socket and substantially enclosing said head and in frictional contact therewith but out of contact with the shank of said stud, whereby to provide, on account of the friction between said head and said bushing, a substantial degree of movement between said head and said bushing due to the flowing of said bushing before any slippage therebetween occurs, said bushing comprising a hollow rubber spherical member adapted to be fitted over said stud and said shell comprising two sections with the portions forming the sockets integrally joined together in a plane passing through said stud so that the oscillatory joint may be assembled upon the two relatively movable members connected thereby.

In testimony whereof I hereby affix my signature.

CARL F. LAUTZ.